United States Patent [19]

Pfeiffer

[11] 4,193,287
[45] Mar. 18, 1980

[54] TECHNIQUE FOR APPLYING POLARIZER MATERIAL TO LIQUID-CRYSTAL DISPLAYS

[75] Inventor: James W. Pfeiffer, Cupertino, Calif.

[73] Assignee: Fairchild Camera and Instrument Corporation, Mountain View, Calif.

[21] Appl. No.: 891,589

[22] Filed: Mar. 30, 1978

[51] Int. Cl.² .............................................. H01S 4/00
[52] U.S. Cl. ................................. 29/593; 29/592 R; 206/329
[58] Field of Search ............. 29/592 R, 593; 350/150; 206/329, 332; 226/86; 156/108

[56] References Cited

U.S. PATENT DOCUMENTS

| | | | |
|---|---|---|---|
| 731,936 | 6/1903 | Munroe | 226/86 |
| 3,608,711 | 9/1971 | Wiesler et al. | 206/329 |
| 4,047,998 | 9/1977 | Yoshikawa et al. | 29/592 R |
| 4,094,058 | 6/1978 | Yasutake et al. | 29/592 R |

FOREIGN PATENT DOCUMENTS 2551364  5/1977  Fed. Rep. of Germany ........... 206/329

*Primary Examiner*—Lowell A. Larson
*Attorney, Agent, or Firm*—Alan H. MacPherson; Ronald J. Meetin; Robert C. Colwell

[57] ABSTRACT

A method for applying polarizer material to partially-finished liquid-crystal displays comprises loading a plurality of partially-finished liquid-crystal devices on a strip carrier, applying adhesive polarizer material in strip form over the liquid-crystal devices on the strip carrier, and cutting the polarizer material to desired size with non-contact cutting means.

7 Claims, 3 Drawing Figures

TECHNIQUE FOR APPLYING POLARIZER MATERIAL TO LIQUID-CRYSTAL DISPLAYS

BACKGROUND OF THE INVENTION

1. Field of the Invention

This invention relates to liquid-crystal electronic technology and more particularly to methods and articles for use in manufacturing and handling liquid-crystal displays.

2. Prior Art

A liquid-crystal display, hereafter referred to as LCD, is essentially a light valve controlled by an electric field impressed across the LCD. Depending on the arrangement of the components of an LCD and on the strength of the applied electric field, light impinging on one face of the LCD will be largely transmitted, partially transmitted, or largely not transmitted through the LCD. This characteristic has many useful applications. By arranging an LCD so that light is transmitted through certain parts of the LCD but is not transmitted through other parts, the LCD can be utilized to show pictures or alphanumeric characters. For example, LCD's are used to show the time of day in electronic watches and to show various types of information in calculators.

An LCD is typically made by sandwiching liquid-crystal material between two glass plates. The glass plates are so treated that the liquid-crystal molecules nearest the plates have preferred orientations relative to the plates in the absence of an electric field. Transparent electroconductive coatings are formed on the inside faces of the glass plates, i.e., the faces directly adjacent to the liquid-crystal material. Leads are attached to the two electroconductive coatings, and an external electric power source is connected to the leads so that an electric field can be applied across the liquid-crystal material in the LCD.

To create the contrast between the areas of an LCD through which polarized light is transmitted and those areas through which polarized light is largely not transmitted, light polarizers are placed over the outside faces of the glass plate. The two polarizers may be arranged so as to have their polarization directions parallel to each other, perpendicular to each other, or at some intermediate angle to each other. Going from one side of an LCD to the other, the components of the basic LCD then are a polarizer, a glass plate with an electroconductive coating on its inside face, a slice of liquid-crystal material, a second glass plate with a second electroconductive coating on its inside face, and a second polarizer.

Goldmacher et al. in U.S. Pat. No. 3,499,702 describes one embodiment of an LCD. In brief, light passing through the first polarizer is plane polarized. In the absence of an electric field, the plane of polarization of the light rotates through a predetermined angle as the light passes through the liquid-crystal material. This angle of twist is established from the internal orientations of the liquid-crystal molecules. As the light reaches the second polarizer, the light is largely transmitted, partially transmitted, or largely absorbed by the second polarizer, depending on the orientation of the second polarizer relative to the first. If an electric field of sufficient strength is applied across the liquid crystal material, the liquid-crystal molecules reorient themselves in such a manner that light passing through the first polarizer maintains the same plane of polarization as the light passes through the liquid-crystal material. Thus, light reaching the second polarizer is transmitted or absorbed in amounts different than the amounts absorbed when no electric field is applied. By applying an electric field across certain regions of an LCD but not across other regions, this phenomenon permits an LCD to show a time-varying picture in which some areas are dark and others are light.

A substantial amount of prior art exists in the manufacturing of LCD's. Herein, we are concerned with the prior art dealing with the application of polarizer material to partially-finished LCD's and subsequent handling of the LCD's.

In the prior art, two principal methods have heretofore existed for applying polarizer material to partially-finished LCD's. In one method, standard polarizer material is cut to the appropriate size to cover the active area of a single LCD. Typically, the polarizer material is cut with a die-cutting machine. An operator then deposits one piece of polarizer material into an alignment cavity, places a partially-finished LCD over the first polarizer, deposits a second polarizer over the LCD, and finally clamps the combination together. The second method is substantially similar to the first method except that polarizer material having a transparent adhesive coating on one side is used in lieu of standard non-adhesive polarizer material. By using adhesive polarizer material, the clamping step is eliminated.

There are a number of disadvantages with the prior art methods for applying polarizer material to partially-finished LCD's. In either prior art method, the operator works on each LCD individually. That is, the operator combines the partially-finished LCD's with the polarizers one LCD at a time. This procedure is inefficient because it takes substantial time for the operator to work on the LCD's individually. Since the LCD's are individually assembled by hand, substantial care must be taken to prevent dirt and bubbles from getting between the glass plates and polarizers and to assure the polarizers are properly aligned with the glass plates. In short, the manual nature of the prior art methods is undesirable because it is highly time consuming and requires a high degree of care to keep the number of unacceptable LCD's at a low level.

A further disadvantage is the inefficient utilization of expensive polarizer material in the prior art methods. The mechanical dies used to cut polarizers from polarizer sheets have about 0.1 inch of material between individual polarizers. As a result, utilization of polarizer sheets is usually not much better than 70% and often much lower. At today's rates, the cost of polarized material actually used in an LCD is around 3% of the total retail price of an LCD. This means that 1–2% of the total cost of an LCD goes into wasted polarizer material.

SUMMARY OF THE INVENTION

An improved method for applying polarizer material to partially-finished LCD's is described. The basic steps comprise loading a plurality of partially-finished LCD's on a strip carrier, applying adhesive polarizer material in strip from over the partially-finished LCD's on at least one side of the strip carrier, and cutting the polarizer material to desired size with non-contact cutting means such that the strip carrier normally remains intact. A strip of adhesive polarizer material is normally no wider than necessary to cover the active areas of the LCD's. A particularly useful type of non-contact cutting means is a laser. Additional steps include marking and electrically testing the LCD's while they are loaded on the strip carrier.

The strip carrier has at least one row of holes in close proximity to each other along the length of the strip carrier for receiving the partially-finished LCD's and has index positioning means for defining the places to cut the polarizer material. A particularly useful form of index positioning means is a series of notches along one or both longitudinal edges of the strip carrier wherein the notches serve to locate the holes on the strip carrier.

The principal advantage of the present invention is that it yields an improvement in overall throughput of finished LCD's. That is, applying polarizer material and testing the LCD's in accordance with the invention enables five to ten times as many LCD's to be finished in the same period of time as prior art manual methods. In the application of polarizer material and cutting of polarizer material to size, the increase in throughput is at least a factor of ten. Automation also leads to increases in throughput for the steps of marking and testing the LCD's since the LCD's are checked as a group rather than individually such that the overall improvement is in the aforementioned range.

Another advantage is that automation reduces the probability that unacceptable air bubbles or dirt will get between the polarizers and glass plates because there is less human handling. Thus, it is easier to maintain a clean manufacturing environment using this invention. Similarly, automating the polarizer application procedure improves the quality control in assuring that the polarizers are properly aligned with the glass plates.

Utilization of expensive polarizer material increases to over 90% under the percent invention, representing an improvement of 20% over the prior art methods. This savings occurs because polarizer strips can be cut from polarizer sheets leaving essentially no wasted polarizer material between strips and because a laser can cut polarizer material with less space between polarizers than occurs with mechanical die cutters.

The present invention offers additional advantages. The new automated procedure can be used with a strip carrier of uniform external dimensions. Different sizes of LCD's can be accommodated by merely adjusting the hole size and index positioning spacing on the strip carrier.

The strip carrier provides a convenient article for storing and shipping LCD's. Inventory control and later inspection are facilitated by having the LCD's loaded on the strip carrier. When the LCD's are removed from the strip carrier for usage, the strip carrier can be disposed of with negligible loss since it is extremely inexpensive.

There is a large reduction in human handling both in the automated assembly and testing procedures under the present invention and in the later storage and shipping using the strip carrier compared to what was done in the prior art. Consequently, a substantial reduction occurs in LCD's that are damaged or must otherwise be rejected due to human error.

Other advantages and features to this invention will become apparent from the following description of the preferred embodiments.

BRIEF DESCRIPTION OF THE DRAWINGS

Like reference numbers are employed in the following descriptions of the drawings to represent the same item or items in the various drawings.

DESCRIPTION OF THE PREFERRED EMBODIMENTS

Figure 1:
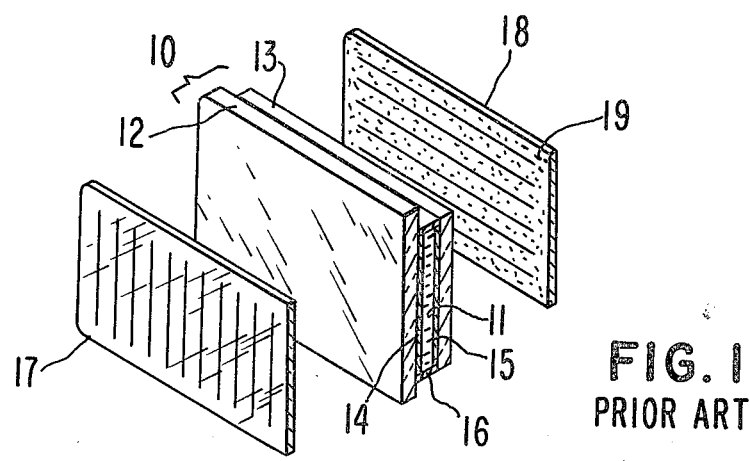
FIG. 1 is a perspective view, partly exploded, of a typical LCD existing in the prior art.

Referring to the drawings, FIG. 1 shows the principal components of a typical partially-finished LCD 10 existing in the prior art. Liquid-crystal material 11 is sandwiched between two glass plates 12 and 13 having transparent electroconductive coatings 14 and 15 on the inside faces of the glass plates 12 and 13. A sealant ring 16 keeps the liquid-crystal material 11 between the glass plates 12 and 13. All of the items described in this paragraph form part of the prior art.

Continuing with FIG. 1, two polarizers 17 and 18 are shown near the partially-finished LCD 10. Each polarizer 17 or 18 has a transparent adhesive coating on the side of the polarizer nearest the partially-finished LCD 10. For simplicity in illustrating the drawing, a transparent adhesive coating 19 is only shown on the second polarizer 18. The polarizers 17 and 18 are pressed onto the outside faces of the glass plates 12 and 13 to complete assembly of the LCD in the prior art.

Figure 2:
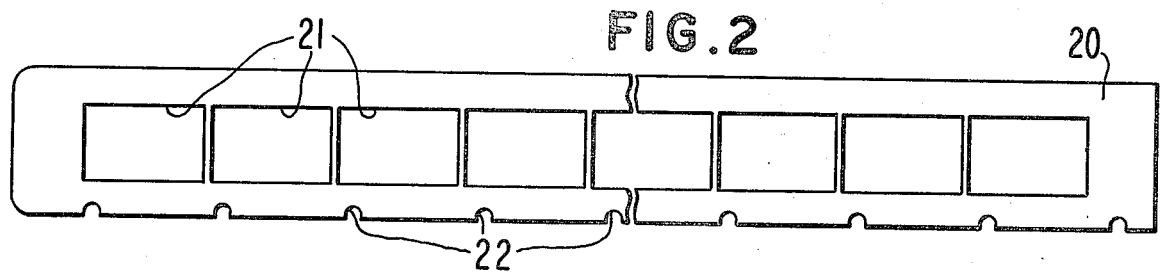
FIG. 2 is a top view showing a strip carrier for LCD's in accordance with the present invention.

FIG. 2 shows a top view of strip carrier 20. The strip carrier 20 is a long, thin strip of material having a row of holes 21 in close proximity to each other along the length of the strip carrier 20 for receiving a plurality of partially-finished LCD's 10 in the plane of the strip carrier 20. The holes 21 may be uniformly spaced along the length of the strip carrier 20, but such spacing is not essential to this invention. The minimal spacing between holes 21 is primarily determined by the structural strength of the material used to fabricate the strip carrier 20. The minimal spacing is normally less than 0.1 inch and may be less than 0.05 inch.

Usually, the holes 21 are just large enough that the partially-finished LCD's 10 fit snugly into the holes 21. LCD's should not fall out of the strip carrier 20 when it is shaken gently.

The strip carrier 20 is normally approximately as thick as a partially-finished LCD 10. A strip carrier 20 of greater thickness might be appropriate if polarizer material is applied on only one side of a partially-finished LCD 10. In such a case, the holes 21 need not penetrate all the way through the thickness of the strip carrier 20.

FIG. 2 depicts the strip carrier 20 as having only one row of holes. Nonetheless, it is intended that this invention also cover a strip carrier having a plurality of rows of holes along the strip carrier's length for receiving partially-finished LCD's 10.

The strip carrier 20 has index positioning means for defining the proper places to cut the polarizer material which is later placed in strip form over the partially-finished LCD's 10 on the strip carrier 20. FIG. 2 shows one especially useful embodiment of index positioning means comprising a series of notches 22 along one longitudinal edge of the strip carrier 20. All the notches 22 are of the same dimensions. Each notch is located at the same position relative to the hole to which the notch is nearest on the strip carrier 20 as each other notch is located relative to its nearest hole. The strip carrier could equally well have notches along both longitudinal edges of the strip carrier. In this case, each pair of notches would be located at the same positions relative to the hole to which the pair are nearest as each other pair is located relative to their nearest hole. Although only notches have been specifically described as index positioning means, this invention is intended to cover all other embodiments of index positioning means consistent with the rest of this disclosure.

The strip carrier 20 may be fabricated from commercially available cardboard or any other similar inexpensive material which holds its shape well and is not likely to cause damage to an LCD.

The strip carrier 20 may be manufactured using a die-stamping machine or similar apparatus. Such machines are old in the art of cutting designs from thin sheets of material and merit no further elaboration herein.

The new method for applying polarizer material to partially-finished LCD's 10 comprises three basic steps.

The first basic step is to load a plurality of partially-finished LCD's on a strip carrier of the type previously described herein. The LCD's 10 are loaded on the strip carrier 20 in such a manner that they lie approximately in the plane of the strip carrier 20.

The LCD's 10 may be loaded on the strip carrier 20 manually or with a machine. The method disclosed herein may utilize and is intended to cover machine loading as well as manual loading.

Figure 3:
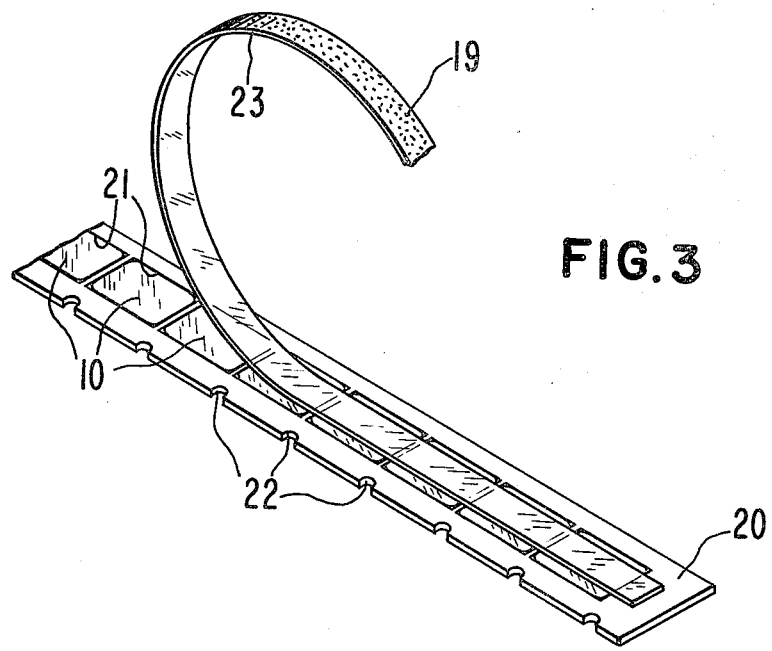
FIG. 3 is a perspective view of part of a strip carrier showing LCD's loaded thereon and showing a strip of polarizer material in the process of being applied over the LCD's on the strip carrier in accordance with the present invention.

Strips of adhesive polarizer material are cut from sheets of adhesive polarizer material to desired width and length for application on strip carriers 20. The strip cutting may be done manually or by machine. FIG. 3 shows a typical strip 23 of adhesive polarizer material. The length of a strip 23 of polarizer material is optimally just slightly shorter than the length of the strip carrier 20. Similarly, the width of the polarizer strip 23 is optimally just great enough to cover the active areas of the partially-finished LCD's 10 loaded on the strip carrier 20.

Adhesive polarizer material is commercially available from a number of sources including Polaroid Corporation.

The second basic step is to apply adhesive polarizer strips 23 over the partially-finished LCD's 10 on both sides of the strip carrier 20. If the particular LCD's 10 require only one polarizer per LCD 10, a polarizer strip 23 will be applied on only one side of the strip carrier 20. FIG. 3 depicts the act of applying a polarizer strip 23.

Polarizer strips 23 may be applied to the partially-finished LCD's 10 on the strip carrier 20 by hand or by machine. The method disclosed herein may utilize either manual application or machine application.

After the polarizer strips are applied, but before the polarizer strips are cut to size, electrical tests are performed on the LCD's to determine acceptability. Unacceptable LCD's 20 are marked for later removal from the strip carrier. LCD's 20 on the strip carrier are dated, coded, and/or otherwise marked for identification. Alternatively, the testing and marking operations could be performed after the polarizer strips are cut to size.

The third basic step is to cut the polarizer strips to desired polarizer size with non-contact cutting means using the index positioning means on the strip carrier 20 to define the proper locations for cutting. Normally, the polarizer cutting is done in such a manner that the strip carrier 20 remains intact. A particularly useful embodiment of non-contact cutting means is a commercial laser.

In typical operations, a strip carrier 20 is fed into a cutting machine having non-contact cutting means. The cutting machine utilizes the index positioning means to move either the strip 20 carrier or the non-contact cutting means from LCD to LCD as the polarizer strip is cut. For example, if notches as previously described are used as the index positioning means, the cutting machine will utilize a notch or notches at one position to locate the place for a cut or cuts, make the cut or cuts, and then index to the next position. Depending on how many sets of non-contact cutting means are used and whether there are one or two polarizers on an LCD, it may be necessary to run the strip carrier 20 through the cutting machine two or more times. Cutting machines which index from position to position are within the skill of experienced mechanical and electrical engineers and are not further elaborated on herein.

After the polarizers have been cut to size, the unacceptable LCD's are removed from the strip carrier 20. The strip carrier containing acceptable LCD's is packed for storage and/or shipment.

The strip carrier and method of fabricating LCD's using the strip carrier have proved successful in reducing the material costs and assembly time for LCD's.

While the invention has been described with reference to illustrative embodiments, the description is solely for the purpose of illustration and is not to be construed as limiting the scope of the invention. For example, a strip carrier having a plurality of rows of holes for receiving LCD's may be employed, and indexing notches may be provided on opposing longitudinal edges of the strip carrier. Thus, various modifications, changes, and applications may be made by those skilled in the art without departing from the true scope and spirit of the invention as defined by the appended claims.

What is claimed is:

1. A method of fabricated liquid-crystal displays (LCD's) including applying polarizer material to partially-finished LCD's, which comprises the following steps:

loading a plurality of partially-finished LCD's on a strip carrier such that the LCD's lie approximately in the plane of the strip carrier;

applying adhesive polarizer material in strip form over the partially-finished LCD's on at least one side of the strip carrier; and cutting the polarizer material to desired size with non-contact cutting means.

2. A method according to claim 1 and further including the step of indexing said strip carrier to facilitate the cutting of said polarizer material for each LCD.

3. A method according to claim 2 wherein said step of indexing includes engaging a series of notches along at least one longitudinal edge of the strip carrier.

4. A method according to claim 1 wherein the adhesive polarizer material in strip form is of length optimally just slightly shorter than the length of the strip carrier and is of width optimally just great enough to cover the active areas of the partially-finished LCD's as loaded on the strip carrier.

5. A method according to claim 1 wherein said step of cutting the polarizer material by non-contact cutting means includes the use of a laser.

6. A method according to claim 1 wherein said step of cutting the polarizer material leaves said strip carrier intact.

7. A method according to claim 1 and further including:

dating, coding, and marking the individual LCD's for identification after they have been loaded on the strip carrier;

testing the individual LCD's to determine acceptability after they have been loaded on the strip carrier; and removing the unacceptable LCD's from the strip carrier after the polarizer material has been cut to desired size.

* * * * *